(No Model.)
F. DE BACKER.
SYRINGE.
No. 558,756.        Patented Apr. 21, 1896.
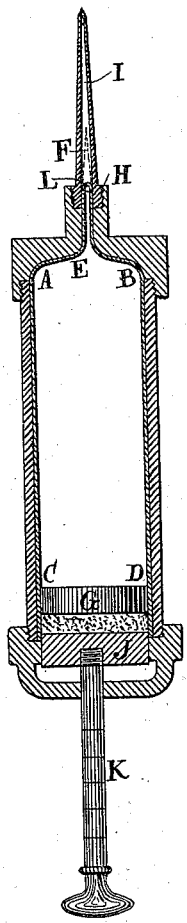
Witnesses                Inventor
Felix de Backer
By P. T. Dodge, Atty.

UNITED STATES PATENT OFFICE.

FELIX DE BACKER, OF PARIS, FRANCE.

SYRINGE.

SPECIFICATION forming part of Letters Patent No. 558,756, dated April 21, 1896.

Application filed July 7, 1894. Serial No. 516,824. (No model.) Patented in France February 28, 1894, No. 236,643.

*To all whom it may concern:*

Be it known that I, FELIX DE BACKER, doctor of medicine, a citizen of the Republic of France, residing at 53 Rue de la Chaussee D'Antin, Paris, in the Republic of France, have invented certain new and useful Improvements in Hypodermic Syringes, (for which I have received Letters Patent in France, filed February 28, 1894, No. 236,643,) of which the following is a specification.

This invention relates to a new kind of syringe for hypodermic injection which allows of liquids being employed which have always been protected from the air.

My invention, which is shown on the accompanying drawing, is composed of three parts, first, the tube; second, the holder or sheath; third, the piston.

The tube which I employ is of a uniform diameter in order to admit of its being fitted to all my patterns of syringes. It is made of strong glass. This tube is composed of a cylindrical part A B C D, terminated by a pointed part E F. The opposite end to this point is open, and it may be closed by means of a stopper G, of cork or other suitable material. The said tube is placed in a perforated metallic sheath or casing. This sheath is provided with an internal screw H, into which a hollow metallic pointed nozzle may be screwed. In the opposite end of the metallic sheath a piston J may be pressed by means of a rod K. This rod is marked with a scale. It may be screwed on the piston J or attached to it in any other manner. The tube A B C D, containing the liquid which is to be injected, is filled and prepared in advance and may be easily sterilized, and these operations may be accomplished with the greatest care. The point of the tube is tapered to form a nozzle. The other end is closed by means of a paraffined stopper, on which a plug of absorbent wadding is also placed. Each tube only contains the quantity of liquid necessary for a single operation.

When it is desired to make an injection, a tube is placed in the metallic sheath, the glass point at L is broken off, and the metallic point I is screwed on the sheath. It is easily understood that by pressing on the piston J by means of the rod K the stopper G is simultaneously pushed forward and itself forms a piston for causing the liquid contained in the tube to flow to the outside. When the operation is terminated, the glass tube is removed from the metallic sheath and thrown away.

The principle of my invention consists, as has just been seen, in preparing tubes hermetically closed, in which the liquid injection is placed, the whole being prepared with the greatest care and by the best antiseptic processes. As the tube is only opened at the moment when it is about to be used, the liquid is always maintained rigorously protected from the air and no alteration can be produced.

It is well understood that I may modify the form and dimensions of my tubes according to circumstances, as well as the arrangement of the metallic sheath.

The tapering and hollow point I may be of any suitable pattern.

I declare that what I claim is—

1. In a hypodermic-injection syringe, the combination with the metallic-sheath piston and pointed nozzle, of a replaceable pointed glass tube hermetically sealed, and adapted to be charged with a sufficient quantity of the liquid to be injected at a single operation, said tube being adapted to be inserted within the sheath and have its point broken off immediately before an operation, and to be replaced by a fresh tube at each operation; whereby non-exposure of the injection liquid to contact with air or other contaminating influences previous to an operation is insured, substantially as hereinbefore set forth.

2. A hypodermic-injection syringe comprising a metallic sheath or casing, a metallic pointed nozzle adapted to be screwed thereon, a piston J, a rod K marked with a scale and connected to said piston, a replaceable pointed glass tube A, B, C, D, adapted to be charged with the liquid to be injected and having its point hermetically sealed and adapted to be broken off before an operation and its open end hermetically closed by a stopper G adapted to be pushed into said tube, in combination, substantially as and for the purpose described and illustrated.

In testimony whereof I have signed my name to this specification in the presence of two subscribing witnesses.

FELIX DE BACKER.

Witnesses:
EMILE ZEITER,
EDWARD P. MACLEAN.